(12) United States Patent
Yamazaki et al.

(10) Patent No.: US 9,478,331 B2
(45) Date of Patent: Oct. 25, 2016

(54) HEXAGONAL STRONTIUM FERRITE MAGNETIC POWDER AND METHOD OF MANUFACTURING THE SAME, AND MAGNETIC RECORDING MEDIUM AND METHOD OF MANUFACTURING THE SAME

(71) Applicant: FUJIFILM Corporation, Minato-ku, Tokyo (JP)

(72) Inventors: Nobuo Yamazaki, Minami-ashigara (JP); Hiroyuki Suzuki, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 104 days.

(21) Appl. No.: 13/839,619

(22) Filed: Mar. 15, 2013

(65) Prior Publication Data
US 2013/0256584 A1    Oct. 3, 2013

(30) Foreign Application Priority Data
Mar. 30, 2012  (JP) ................. 2012-079063

(51) Int. Cl.
| | | |
|---|---|---|
| *H01F 1/11* | (2006.01) | |
| *H01F 1/36* | (2006.01) | |
| *C04B 35/26* | (2006.01) | |
| *H01F 1/01* | (2006.01) | |
| *C01G 49/00* | (2006.01) | |

(52) U.S. Cl.
CPC .............. *H01F 1/01* (2013.01); *C01G 49/0036* (2013.01); *C04B 35/2683* (2013.01); *H01F 1/11* (2013.01);
(Continued)

(58) Field of Classification Search
CPC .............. C04B 2235/3213; C04B 2235/3215; C04B 2235/5436; C04B 2235/785; C04B 2235/767; C04B 2235/3251; C04B 2235/36; C04B 2235/5454; C04B 2235/421; C04B 2235/442; C04B 35/2633; C04B 35/2641; C04B 35/26; C04B 35/2666; C04B 35/2683; H01F 1/11; H01F 1/0045; H01F 1/36; H01F 1/01; H01F 1/344; H01F 7/02; C01P 2004/64; C01P 2004/04; C01P 2004/62; C01P 2006/42; C01P 2004/61; C01P 2004/60; B82Y 30/00; B82Y 25/00; C01G 49/0036
USPC ...... 252/62.56, 62.55, 62.51 R, 62.58, 62.57; 977/773, 811; 423/594.1; 264/611
See application file for complete search history.

(56) References Cited

U.S. PATENT DOCUMENTS

| | | | |
|---|---|---|---|
| 3,716,630 A | * | 2/1973 | Shirk ................. C01G 49/0036 252/62.53 |
| 4,341,648 A | | 7/1982 | Kubo et al. |

(Continued)

FOREIGN PATENT DOCUMENTS

| | | |
|---|---|---|
| JP | 48-022265 | 7/1973 |
| JP | 56-169128 A | 12/1981 |

(Continued)

OTHER PUBLICATIONS

Office Action dated Mar. 4, 2014 in Japanese Application No. 2012-079063.

*Primary Examiner* — Matthew E Hoban
*Assistant Examiner* — Lynne Edmondson
(74) *Attorney, Agent, or Firm* — Sughrue Mion, PLLC

(57) ABSTRACT

An aspect of the present invention relates to a method of manufacturing hexagonal strontium ferrite magnetic powder, which comprises melting a starting material mixture which has a composition, as a composition converted into an oxide, lying within a region enclosed by the following four points:
(a) SrO=48.0 mol %, $Fe_2O_3$=17.2 mol %, $B_2O_3$=34.8 mol %;
(b) SrO=55.9 mol %, $Fe_2O_3$=17.7 mol %, $B_2O_3$=26.4 mol %;
(c) SrO=41.7 mol %, $Fe_2O_3$=40.9 mol %, $B_2O_3$=17.4 mol %;
(d) SrO=36.7 mol %, $Fe_2O_3$=40.1 mol %, $B_2O_3$=23.2 mol %;
in a ternary diagram with SrO, $Fe_2O_3$, which may include an Fe substitution element, and $B_2O_3$ as apexes, to provide a melt, and quenching the melt to obtain a solidified product; and heat treating the solidified product to precipitate hexagonal strontium ferrite magnetic particles within the solidified product.

2 Claims, 4 Drawing Sheets

(52) U.S. Cl.
CPC ........ *C01P 2004/04* (2013.01); *C01P 2006/42* (2013.01); *C04B 2235/3213* (2013.01); *C04B 2235/3215* (2013.01); *C04B 2235/3217* (2013.01); *C04B 2235/3251* (2013.01); *C04B 2235/3284* (2013.01); *C04B 2235/421* (2013.01); *C04B 2235/442* (2013.01); *C04B 2235/767* (2013.01)

(56) References Cited

U.S. PATENT DOCUMENTS

| | | | |
|---|---|---|---|
| 4,569,775 | A | 2/1986 | Kubo et al. |
| 6,248,253 | B1 * | 6/2001 | Taguchi et al. ............ 252/62.63 |
| 2005/0282042 | A1 * | 12/2005 | Yamazaki .......... G11B 5/70678 428/842.8 |
| 2010/0246063 | A1 * | 9/2010 | Kamisawa ............. B82Y 30/00 360/131 |
| 2010/0304187 | A1 * | 12/2010 | Matsubaguchi ....... B82Y 30/00 428/836 |
| 2012/0251844 | A1 * | 10/2012 | Yamazaki et al. ............ 428/800 |

FOREIGN PATENT DOCUMENTS

| | | |
|---|---|---|
| JP | 60-015575 B2 | 4/1985 |
| JP | 61-220126 A | 9/1986 |
| JP | 64-035901 A | 2/1989 |

* cited by examiner

HEXAGONAL STRONTIUM FERRITE MAGNETIC POWDER AND METHOD OF MANUFACTURING THE SAME, AND MAGNETIC RECORDING MEDIUM AND METHOD OF MANUFACTURING THE SAME

CROSS-REFERENCE TO RELATED APPLICATIONS

This application claims the benefit of priority under 35 USC 119 to Japanese Patent Application No. 2012-079063 filed on Mar. 30, 2012, which is expressly incorporated herein by reference in its entirety.

BACKGROUND OF THE INVENTION

1. Field of the Invention

The present invention relates to hexagonal strontium ferrite magnetic powder and a method of manufacturing the same. More particularly, the present invention relates to hexagonal strontium ferrite magnetic powder that is suitable for use as a magnetic material in magnetic recording media for high-density recording.

The present invention further relates to a magnetic recording medium comprising the above hexagonal strontium ferrite magnetic powder in a magnetic layer, and to a method of manufacturing the same.

2. Discussion of the Background

Hexagonal ferrite powder is widely employed as magnetic powder in magnetic recording. It has a coercive force that is high enough for use as a permanent magnetic material. Its magnetic anisotropy, which is responsible for the coercive force, is derived from the crystalline structure and thus can ensure a high coercive force even when the size of the particles is reduced. Further, a magnetic recording medium with a magnetic layer in which hexagonal ferrite magnetic powder is employed will have a high density characteristic due to the vertical component. Thus, hexagonal ferrite magnetic powder is suited to achieving high densities. Known methods of manufacturing hexagonal ferrite magnetic particles include the glass crystallization method, the hydrothermal synthesis method, and the coprecipitation method. From the perspective of obtaining a magnetic powder having the microparticle suitability and single particle dispersion suitability that are desirable in a magnetic recording medium, the glass crystallization method is a good method of manufacturing the hexagonal ferrite used in magnetic recording media. Thus, various methods of manufacturing hexagonal ferrite magnetic powder by the glass crystallization method have been examined (for example, see Japanese Examined Patent Publication (KOKOKU) Showa No. 60-15575 or English language family member U.S. Pat. No. 4,341,648, and Japanese Unexamined Patent Publication (KOKAI) Showa No. 56-169128 or English language family member U.S. Pat. No. 4,569,775, which are expressly incorporated herein by reference in their entirety).

In recent years, ever higher levels of recording density have been achieved in the field of magnetic recording. Magnetic tapes employing hexagonal barium ferrite magnetic powder achieving a surface recording density of 29.5 bpsi have been announced. Achieving still higher levels of high-density recording will require employing microparticulate hexagonal ferrite magnetic particles to reduce noise.

However, when the size of hexagonal ferrite magnetic particles is reduced, the energy for maintaining the direction of magnetization of the magnetic particles (the magnetic energy) tends to become inadequate to counter thermal energy, and thermal fluctuation ends up compromising the retention of recording. The phenomenon of magnetic energy being overcome by thermal energy, thereby compromising recording, can no longer be ignored. This point can be described as follows. "KuV/kT" is a known index of the thermal stability of magnetization. Ku is the anisotropy constant of a magnetic powder, V is the particle volume (activation volume), k is the Boltzmann constant, and T is absolute temperature. Increasing the magnetic energy KuV relative to the thermal energy kT can inhibit the effect of thermal fluctuation. However, the particle volume V, that is, the size of the particles in the magnetic material, should be small to reduce medium noise, as set forth above. Since the magnetic energy is the product of Ku multiplied by V, as stated above, it suffices to increase Ku to increase the magnetization energy when K is in the low range. However, Ku is related to the anisotropic magnetic field by HK=2Ku/Ms. When Ku is increased without changing Ms, HK also increases. The anisotropic magnetic field HK (is the magnetic field strength that is required to achieve saturation magnetization in the direction of the hard magnetization axis. When HK increases, the reversal of magnetization by the magnetic head tends not to occur, recording (the writing of information) becomes difficult, and reproduction output drops. That is, the higher the Ku of a magnetic particle, the more difficult the writing of information becomes.

As set forth in the above description, it is extremely difficult to satisfy all three characteristics of high-density recording, thermal stability, and ease of writing. This is known as the magnetic recording trilemma. It will be a major issue in the future as advances are made to still higher density levels of recording. In magnetic recording, barium ferrite is widely employed as a hexagonal ferrite magnetic particle. However, strontium ferrite is known to have a higher Ku and σs than barium ferrite. In this context, since HK=2Ku/Ms and Ms=σs×ρ (ρ: specific gravity), by lowering HK while raising Ku to resolve the trilemma, strontium ferrite is an advantageous magnetic material.

However, in conventional techniques including the above publications, the hexagonal ferrite magnetic particles that are actually produced and used as magnetic powder in magnetic recording are all barium ferrite. Investigation conducted by the present inventors has revealed no instance of the use of strontium ferrite. One reason for this could be difficulty in reducing the size of strontium ferrite particles. In this regard, the present inventors thought that since the crystallization temperature of strontium ferrite is about several 10° C. higher than that of barium ferrite, it would tend to promote nucleus growth and produce coarse crystals in the process of crystallization by the glass crystallization method. Conversion from an irregular amorphous structure to a regular crystalline structure requires that strontium ferrite structural elements migrate by diffusion. However, due to the difference in the melting points of SrO (2,430° C.) and BaO (1,923° C.), the temperature of crystallization of strontium ferrite is presumed to be higher than that of barium ferrite. Further, strontium ferrite tends to have a broader particle size distribution than barium ferrite. Although the reason for this is unclear, it has impeded the use of strontium ferrite as a magnetic powder in magnetic recording.

SUMMARY OF THE INVENTION

An aspect of the present invention provides for hexagonal strontium ferrite magnetic powder that is suitable as magnetic powder for high-density recording.

The present inventors conducted extensive research into the composition of starting material mixtures employed in the glass crystallization method to achieve the above-stated hexagonal strontium ferrite magnetic powder.

Normally, a starting material composition producing $BaO \cdot 6Fe_2O_3$ and a by-product in the form of $BaO \cdot B_2O_3$ following the crystallization of amorphous materials is selected in the manufacturing of barium ferrite by the glass crystallization method. However, as stated above, the usual compositions that produce compositions of strontium ferrite corresponding to those of barium ferrite, $SrO \cdot 6Fe_2O_3$ and $SrO \cdot B_2O_3$, do not readily yield microparticles and have a broad particle size distribution. The present inventors conducted extensive research, resulting in the discovery that compositions producing a by-product in the form of $2SrO \cdot B_2O_3$, or $2SrO \cdot B_2O_3$ along with $SrO \cdot B_2O_3$, were effective for obtaining microparticulate strontium ferrite with a uniform particle size distribution. Specifically, when the proportion of the $2SrO \cdot B_2O_3$ in the by-product was defined by the following equation as value A, the particle size decreased as value A increased, reaching equal to or more than 30 mol % and making it possible to obtain microparticulate strontium ferrite suited to high-density recording. However, it also became clear that from the perspective of maintaining a high σs, the upper limit should be made 100 mol %.

$$\text{value } A = [2SrO \cdot B_2O_3 / (SrO \cdot B_2O_3 + 2SrO \cdot B_2O_3)] \times 100 \text{ [mol \%]}$$

Further, within the range of 30 to 60 mol % value A, from the industrial perspectives of the melting property of the starting material, suitability to removal of the melt from the crucible, and the magnetic powder yield, it was determined that the value F (the quantity of $SrO \cdot 6Fe_2O_3$ in 100 g of heated product following a heat treatment to crystallize amorphous materials) defined by the following equation should be made 30 to 60 weight percent.

$$\text{value } F = [SrO \cdot 6Fe_2O_3 / (SrO \cdot 6Fe_2O_3 + SrO \cdot B_2O_3 + 2SrO \cdot B_2O_3)] \times 100 \text{ [weight percent]}$$

In the above technical thinking, which differs from the composition adjustment in the manufacturing of barium ferrite, the present inventors specified in a ternary diagram with apexes in the form of SrO, $Fe_2O_3$ (which may include Fe-substitution elements), and $B_2O_3$, the compositions corresponding to a value A of 30 to 100 mol % and a value F of 30 to 60 weight percent, as oxide-converted compositions. They discovered that by employing starting material mixtures having compositions defined in this manner, it was possible to obtain microparticulate hexagonal strontium ferrite magnetic powder with a sharp particle size distribution by the glass crystallization method. The present invention was devised on that basis.

An aspect of the present invention relates to:

a method of manufacturing hexagonal strontium ferrite magnetic powder, which comprises:

melting a starting material mixture which has a composition, as a composition converted into an oxide, lying within a region enclosed by the following four points:

(a) SrO=48.0 mol %, $Fe_2O_3$=17.2 mol %, $B_2O_3$=34.8 mol %;
(b) SrO=55.9 mol %, $Fe_2O_3$=17.7 mol %, $B_2O_3$=26.4 mol %;
(c) SrO=41.7 mol %, $Fe_2O_3$=40.9 mol %, $B_2O_3$=17.4 mol %;
(d) SrO=36.7 mol %, $Fe_2O_3$=40.1 mol %, $B_2O_3$=23.2 mol %;

in a ternary diagram with SrO, $Fe_2O_3$, which may include an Fe substitution element, and $B_2O_3$ as apexes, to provide a melt, and quenching the melt to obtain a solidified product; and heat treating the solidified product to precipitate hexagonal strontium ferrite magnetic particles within the solidified product.

In an embodiment, the composition of the starting material mixture lies within a region enclosed by the following points:

(e) SrO=48.3 mol %, $Fe_2O_3$=17.2 mol %, $B_2O_3$=34.5 mol %;
(f) SrO=55.9 mol %, $Fe_2O_3$=17.7 mol %, $B_2O_3$=26.4 mol %;
(g) SrO=42.8 mol %, $Fe_2O_3$=39.1 mol %, $B_2O_3$=18.1 mol %;

in the ternary diagram.

In an embodiment, the heat treatment provides precipitated hexagonal strontium ferrite magnetic particles with an activation volume ranging from 1,000 to 2,100 $nm^3$.

In an embodiment, the method of manufacturing hexagonal strontium ferrite magnetic powder comprises conducting the heat treatment by heating and maintaining the solidified product in a temperature region ranging from 600° C. to 750° C.

A further aspect of the present invention relates to hexagonal strontium ferrite magnetic powder prepared by the above manufacturing method.

In an embodiment, the hexagonal strontium ferrite magnetic powder has an activation volume ranging from 1,000 to 2,100 $nm^3$.

In an embodiment, the hexagonal strontium ferrite magnetic powder has a saturation magnetization ranging from 40 to 60 $A \cdot m^2/kg$.

In an embodiment, the hexagonal strontium ferrite magnetic powder has a thermal stability in the form of KuV/kT of equal to or greater than 50, wherein Ku denotes an anisotropy constant, V denotes an activation volume, k denotes a Boltzmann constant, and T denotes an absolute temperature.

In an embodiment, the hexagonal strontium ferrite magnetic powder is employed for magnetic recording.

A further aspect of the present invention relates to a magnetic recording medium, which comprises a magnetic layer containing the above hexagonal strontium ferrite magnetic powder and a binder, on a nonmagnetic support.

A further aspect of the present invention relates to a method of manufacturing a magnetic recording medium, which comprises:

conducting the above manufacturing method to provide hexagonal strontium ferrite magnetic powder; and preparing a magnetic layer with a magnetic coating material which comprises the hexagonal strontium ferrite magnetic powder.

The present invention can provide hexagonal strontium ferrite magnetic powder that can contributes to resolving the trilemma of magnetic recording, thereby permitting further advances in high-density recording.

Other exemplary embodiments and advantages of the present invention may be ascertained by reviewing the present disclosure and the accompanying drawing.

BRIEF DESCRIPTION OF THE DRAWINGS

The present invention will be described in the following text by the exemplary, non-limiting embodiments shown in the figure, wherein.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

An aspect of the present invention relates to a method of manufacturing hexagonal strontium ferrite magnetic powder, which comprises:

melting a starting material mixture which has a composition, as a composition converted into an oxide, lying within a region enclosed by the following four points:

(a) SrO=48.0 mol %, $Fe_2O_3$=17.2 mol %, $B_2O_3$=34.8 mol %;

(b) SrO=55.9 mol %, $Fe_2O_3$=17.7 mol %, $B_2O_3$=26.4 mol %;

(c) SrO=41.7 mol %, $Fe_2O_3$=40.9 mol %, $B_2O_3$=17.4 mol %;

(d) SrO=3.6.7 mol %, $Fe_2O_3$=40.1 mol %, $B_2O_3$=23.2 mol %;

in a ternary diagram with SrO, $Fe_2O_3$, which may contain an Fe substitution element, and $B_2O_3$ as apexes, to provide a melt, and quenching the melt to obtain a solidified product; and heat treating the solidified product to precipitate hexagonal strontium ferrite magnetic particles within the solidified product.

Figure 1:
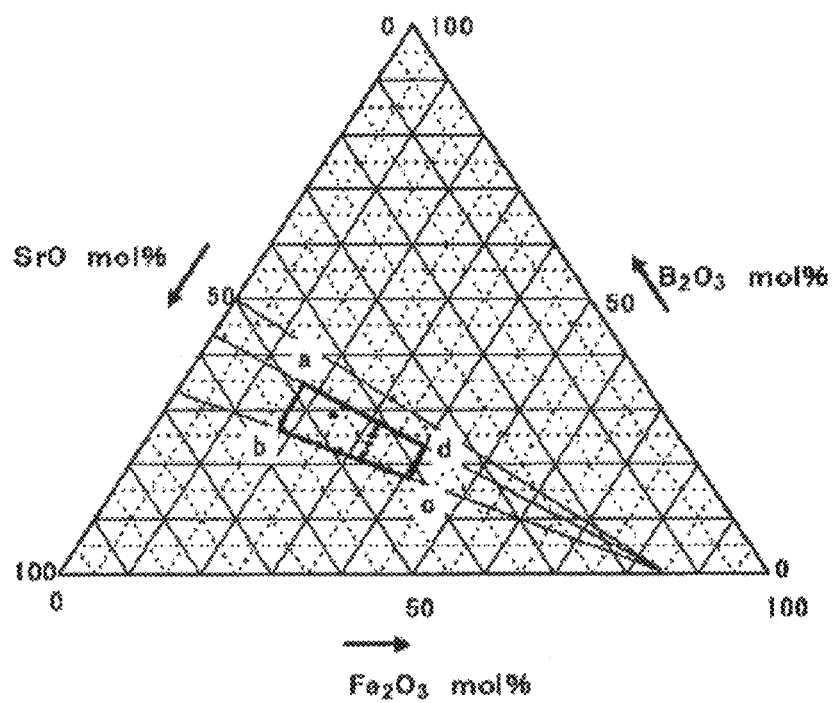
FIG. 1 is a ternary diagram of starting material mixture composition.

As set forth above, the above composition region is defined based on value A and value F. It is the range enclosed by the heavy lines in the ternary diagram shown in FIG. 1. Employing a starting material mixture with a composition falling within this region in the glass crystallization method makes it possible to obtain a hexagonal strontium ferrite magnetic powder that is suitable as a magnetic material in high-density recording magnetic recording media having low noise and good electromagnetic characteristics.

The method of manufacturing hexagonal strontium ferrite magnetic powder of an aspect of the present invention will be described in greater detail below.

Melting the Starting Material Mixture

The starting material mixture that is employed in the glass crystallization method comprises glass-forming components and hexagonal ferrite-forming components. The glass-forming components are components that exhibit a glass transition phenomenon and are capable of becoming amorphous (vitrifying). A $B_2O_3$ component is employed in an aspect of the present invention. In the glass crystallization method, the various components that are contained in the starting material mixture are present in the form of oxides or in the form of various salts that are capable of converting into oxides in a step such as melting. In the present invention, the term "$B_2O_3$ component" includes $B_2O_3$ itself as well as various salts such as $H_3BO_3$ that are capable of converting into $B_2O_3$ in the steps. The same applies to other components hereinafter. In an aspect of the present invention, the composition that is defined by the ternary diagram as set forth above includes compositions in which a portion of the $B_2O_3$ component has been replaced with another glass-forming component, such as an $SiO_2$ component, $P_2O_5$ component, $GeO_2$ component, or $Al_2O_3$ component. The same applies to the $Fe_2O_3$ component, described further below as a hexagonal ferrite-forming component.

The hexagonal ferrite-forming components that are contained in the starting material mixture employed in an aspect of the present invention are an $Fe_2O_3$ component and an SrO component, which serve as structural components in the hexagonal strontium ferrite magnetic particles. A portion of the Fe may be replaced with another metallic element to adjust the coercive force in the hexagonal strontium ferrite magnetic powder. Examples of the substitution element are: Co—Zn—Nb, Zn—Nb, Co, Zn, Nb, Co—Ti, Co—Ti—Sn, Co—Sn—Nb, Co—Zn—Sn—Nb, Co—Zn—Zr—Nb, and Co—Zn—Mn—Nb. It suffices to employ in combination a component to adjust the coercive force as a hexagonal ferrite-forming component to obtain such a hexagonal strontium ferrite magnetic powder. Examples of the coercive force-adjusting component are divalent metal oxide components such as CoO and ZnO; tetravalent metal oxide components such as $TiO_2$, $ZrO_2$, $SnO_2$, and $MnO_2$; and pentavalent metal oxide components such as $Nb_2O_5$. When employing the above coercive force-adjusting components, the content thereof can be suitably determined in accordance with the desired coercive force or the like.

The composition of the starting material mixture employed in an aspect of the present invention is as set forth above. From the perspective of obtaining hexagonal strontium ferrite magnetic powder having even better characteristics, it is preferable to employ a starting material mixture having a composition lying within the region enclosed by the following three points:
(e) SrO=48.3 mol %, $Fe_2O_3$=17.2 mol %, $B_2O_3$=34.5 mol %;
(f) SrO=55.9 mol %, $Fe_2O_3$=17.7 mol %, $B_2O_3$=26.4 mol %;
(g) SrO=42.8 mol %, $Fe_2O_3$=39.1 mol %, $B_2O_3$=18.1 mol %;
in the above ternary diagram.

Melting and Solidifying (Rending Amorphous) the Starting Material Mixture

The starting material mixture can be obtained by weighing out and mixing the various components set forth above. The starting material mixture is then melted to obtain a melt. The melting temperature can be set based on the starting material composition and is normally 1,000 to 1,500° C. The melting time can be suitably set so as to adequately melt the starting material mixture.

Next, the melt that has been obtained is quenched to obtain a solidified product. The solidified product obtained is an amorphous material that has been rendered amorphous (vitrified) by the glass-forming component. The quenching can be implemented in the same manner as in the quenching step that is commonly conducted to obtain an amorphous material in the glass crystallization method. For example, it can be conducted by a known method such as quench rolling whereby the melt is poured onto a pair of water-cooled rollers that are being rapidly rotated.

Heat Treating (Crystallizing) the Solidified Product

The solidified product obtained following the above quenching is then heat treated. This step can cause the hexagonal strontium ferrite magnetic particles and the crystallized glass component to precipitate. The particle size of the hexagonal strontium ferrite magnetic particles that precipitate can be controlled by means of the heating conditions. In the conventional glass crystallization method, it is difficult to get microparticulate hexagonal strontium ferrite magnetic particles to precipitate even by controlling the heating conditions. However, in an aspect of the present invention, using a starting material mixture of the above-stated composition, it is possible to get microparticulate hexagonal strontium ferrite magnetic particles, for example, of a particle size of 1,000 to 2,100 $nm^3$ as an activation volume V (also referred to as "Vact" hereinafter) that are suited to high-density recording magnetic recording media. In the comminution treatment and dispersion processing in the coating liquid set forth further below, the particle size of the hexagonal strontium ferrite magnetic particles does not change. From the perspective of getting crystals of the above preferred activation volume to precipitate, the temperature of the heating conducted to induce crystallization (crystallization temperature) preferably falls within a range of 600° C. to 750° C. The period of heating conducted to induce crystallization (the period during which the heating temperature is maintained) is for example 0.1 to 24 hours, preferably 0.15 to 8 hours. The rate of temperature increase up to the crystallization temperature is, for example, suitably about 0.2 to 10° C./minute.

Hexagonal strontium ferrite magnetic particles and the crystallized glass component precipitate within the heat-treated product that has been subjected to the above heat treatment. Accordingly, when the heat-treated product is subjected to an acid treatment, the crystallized glass component enveloping the particles can be dissolved away, leaving hexagonal strontium ferrite magnetic particles. Prior to the acid treatment, it is preferable to conduct a comminution treatment to increase the effectiveness of the acid treatment. The crude comminution can be conducted by either a wet or dry method. From the perspective of permitting uniform comminution, wet comminution is preferable. The comminution processing conditions can be set based on known methods, and reference can be made to Examples set forth further below. The acid treatment conducted to collect the particles can be a method that is commonly conducted in glass crystallization methods such as an acid treatment with heating, and reference can be made to Examples further below. Subsequently, post-processing such as rinsing with water and drying can be conducted as needed to obtain hexagonal strontium ferrite magnetic particles.

According to an aspect of the present invention, it is possible to obtain a microparticulate hexagonal strontium ferrite magnetic powder that can exhibit a sharp particle size distribution by means of the steps set forth above. The particle size distribution of the hexagonal strontium ferrite magnetic powder that is obtained can be evaluated, for example, by taking a photograph with a transmission electron microscope, randomly extracting 500 particles, measuring the plate diameters thereof, calculating the average (average plate diameter) thereof, determining the standard deviation of the plate diameters of the 500 particles, and dividing it by the plate diameter (coefficient of variation of particle diameter distribution). According to an aspect of the present invention, it is possible to obtain hexagonal strontium ferrite magnetic powder exhibiting a particle size distribution of equal to or less than 40%, or equal to or less than 30%—for example, 15 to 30%—as a coefficient of variation of particle size distribution. In hexagonal strontium ferrite magnetic powder of broad particle size distribution, many particles are present that fall far outside the average particle size. Among such particles, the small ones act as nonmagnetic particles without contributing to electromagnetic characteristics and the large ones become a source of noise. In contrast to the numerous particles that compromise electromagnetic characteristics or do not contribute to electromagnetic characteristics that are present when the particle size distribution is broad, an aspect of the present invention can yield hexagonal strontium ferrite magnetic powder with a sharp particle size distribution affording good electromagnetic characteristics. As set forth above, the high σs of strontium ferrite is advantageous in resolving the trilemma. An aspect of the present invention can yield hexagonal strontium ferrite magnetic powder with a magnetization saturation σs of, for example, equal to or higher than 40 $A·m^2/kg$. From the perspective of controlling the noise accompanying the reproduction signal and saturation of GMR reproduction heads, it is generally thought that a σs that is not excessively high is good. From this perspective, the upper limit of the σs can be set to about 60 $A·m^2/kg$. However, from the perspective of recording characteristics and reproduction output, the higher the σs the better. Accordingly, magnetic particles imparted with a higher σs where noise and head saturation generation are controlled through system optimization and the like can be employed to achieve better recording characteristics and enhanced reproduction output.

Strontium ferrite is also an advantageous material in terms of achieving a high Ku. The hexagonal strontium ferrite magnetic powder obtained in an aspect of the present invention can exhibit, for example, a thermal stability in the form of a KuV/kT [Ku: anisotropy constant; V: activation volume; k: Boltzmann constant; T: absolute temperature] of equal to or higher than 50 even for a small particle size (activation volume V). The larger KuV/kT the better from the perspective of thermal stability. The upper limit is not specifically limited. For example, since strontium ferrite can yield a high σs even for a high KuV/kT of about 100, it is possible to ensure ease of writing.

A further aspect of the present invention relates to hexagonal strontium ferrite magnetic powder obtained by the above-described manufacturing method of an aspect of the present invention. As set forth above, the hexagonal strontium ferrite magnetic powder of an aspect of the present invention can contribute to resolving the trilemma of magnetic recording, and is suitable for use as a magnetic material in magnetic recording, particularly as a magnetic powder employed in high-density recording magnetic recording media.

A further aspect of the present invention relates to a magnetic recording medium comprising a magnetic layer which contains the hexagonal strontium ferrite magnetic powder according to an aspect of the present invention and a binder on a nonmagnetic support. As set forth above, the hexagonal strontium ferrite magnetic powder of an aspect of the present invention can achieve the three characteristics of high-density recording, thermal stability, and ease of writing, thereby resolving the trilemma and permitting further advances in high-density recording.

A further aspect of the present invention relates to a method of manufacturing a magnetic recording medium, comprising conducting the above-described manufacturing method of an aspect of the present invention to provide hexagonal strontium ferrite magnetic powder; and preparing a magnetic layer with a magnetic coating material which comprises the hexagonal strontium ferrite magnetic powder thus obtained.

The magnetic recording medium and method of manufacturing the same according to an aspect of the present invention will be described in greater detail below.

Magnetic Layer

Details of the hexagonal strontium ferrite magnetic powder employed in the magnetic layer, and the method of manufacturing the powder, are as set forth above. In addition to the hexagonal strontium ferrite magnetic powder, the magnetic layer comprises a binder. Examples of the binder comprised in the magnetic layer are: polyurethane resins; polyester resins; polyamide resins; vinyl chloride resins; styrene; acrylonitrile; methyl methacrylate and other copolymerized acrylic resins; nitrocellulose and other cellulose resins; epoxy resins; phenoxy resins; and polyvinyl acetal, polyvinyl butyral, and other polyvinyl alkyral resins. These may be employed singly or in combinations of two or more. Of these, the desirable binders are the polyurethane resins, acrylic resins, cellulose resins, and vinyl chloride resins. These resins may also be employed as binders in the nonmagnetic layer described further below. Reference can be made to paragraphs [0029] to [0031] in Japanese Unexamined Patent Publication (KOKAI) No. 2010-24113, which is expressly incorporated herein by reference in its entirety, for details of the binder. A polyisocyanate curing agent may also be employed with the above resins.

Additives can be added as needed to the magnetic layer. Examples of these additives are abrasives, lubricants, dispersing agents, dispersion adjuvants, antifungal agents, antistatic agents, oxidation-inhibiting agents, solvents, and carbon black. The additives set forth above may be suitably selected for use based on desired properties in the form of commercial products or those manufactured by the known methods. Reference can also be made to paragraph [0033] in Japanese Unexamined Patent Publication (KOKAI) No. 2010-24113 for details of the carbon black.

Nonmagnetic Layer

Details of the nonmagnetic layer will be described below. The magnetic recording medium of an aspect of the present invention may comprise a nonmagnetic layer comprising a nonmagnetic powder and a binder between the nonmagnetic support and the magnetic layer. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides. These nonmagnetic powders are commercially available and can be manufactured by the known methods. Reference can be made to paragraphs [0036] to [0039] in Japanese Unexamined Patent Publication (KOKAI) No. 2010-24113 for details thereof.

Binder resins, lubricants, dispersing agents, additives, solvents, dispersion methods, and the like suited to the magnetic layer may be adopted to the nonmagnetic layer. In particular, known techniques for the quantity and type of binder resin and the quantity and type of additives and dispersing agents employed in the magnetic layer may be adopted thereto. Carbon black and organic powders can be added to the magnetic layer. Reference can be made to paragraphs [0040] to [0042] in Japanese Unexamined Patent Publication (KOKAI) No. 2010-24113 for details thereof.

Nonmagnetic Support

A known film such as biaxially-oriented polyethylene terephthalate, polyethylene naphthalate, polyamide, polyamidoimide, or aromatic polyamide can be employed as the nonmagnetic support. Of these, polyethylene terephthalate, polyethylene naphthalate, and polyamide are preferred.

These supports can be corona discharge treated, plasma treated, treated to facilitate adhesion, heat treated, or the like in advance. The center average roughness, Ra, at a cutoff value of 0.25 mm of the nonmagnetic support suitable for use in an aspect of the present invention preferably ranges from 3 to 10 nm.

Layer Structure

As for the thickness structure of an aspect of the magnetic recording medium of the present invention, the thickness of the nonmagnetic support preferably ranges from 3 to 80 μm. The thickness of the magnetic layer can be optimized based on the saturation magnetization of the magnetic head employed, the length of the head gap, and the recording signal band, and is normally 10 to 150 nm, preferably 20 to 120 nm, and more preferably, 30 to 100 nm. At least one magnetic layer is sufficient. The magnetic layer may be divided into two or more layers having different magnetic characteristics, and a known configuration relating to multilayered magnetic layer may be applied.

The nonmagnetic layer is, for example, 0.1 to 3.0 μm, preferably 0.3 to 2.0 μm, and more preferably, 0.5 to 1.5 μm in thickness. The nonmagnetic layer of an aspect of the magnetic recording medium of the present invention can exhibit its effect so long as it is substantially nonmagnetic.

It can exhibit the effect of the present invention, and can be deemed to have essentially the same structure as the magnetic recording medium of the present invention, for example, even when impurities are contained or a small quantity of magnetic material is intentionally incorporated. The term "essentially the same" means that the residual magnetic flux density of the nonmagnetic layer is equal to or lower than 10 mT, or the coercive force is equal to or lower than 7.96 kA/m (equal to or lower than 100 Oe), with desirably no residual magnetic flux density or coercive force being present.

Backcoat Layer

A backcoat layer can be provided on the surface of the nonmagnetic support opposite to the surface on which the magnetic layer are provided, in the magnetic recording medium of the present invention. The backcoat layer desirably comprises carbon black and inorganic powder. The formula of the magnetic layer or nonmagnetic layer can be applied to the binder and various additives for the formation of the back layer. The back layer is preferably equal to or less than 0.9 μm, more preferably 0.1 to 0.7 μm, in thickness.

Manufacturing Method

The process for manufacturing magnetic layer, nonmagnetic layer and backcoat layer coating liquids normally comprises at least a kneading step, a dispersing step, and a mixing step to be carried out, if necessary, before and/or after the kneading and dispersing steps. Each of the individual steps may be divided into two or more stages. All of the starting materials employed in the present invention, including the hexagonal strontium ferrite magnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these applications are incorporated herein by reference in their entirety. Further, glass beads may be employed to disperse the magnetic layer, nonmagnetic layer and backcoat layer coating liquids. Dispersing media with a high specific gravity such as zirconia beads, titania beads, and steel beads are also suitable for use. The particle diameter and filling rate of these dispersing media can be optimized for use. A known dispersing device may be employed. Reference can be made to paragraphs [0051] to [0057] in Japanese Unexamined Patent Publication (KOKAI) No. 2010-24113 for details of the method of manufacturing a magnetic recording medium.

The magnetic recording medium of an aspect of the present invention set forth above can exhibit a high SNR and high reproduction output in the region of high recording density by containing the hexagonal strontium ferrite magnetic powder of an aspect of the present invention. Thus, it is suitable as a high-density recording magnetic recording medium of which good electromagnetic characteristics are demanded.

EXAMPLES

The present invention will be described in detail below based on Examples. However, the present invention is not limited to Examples. The terms "parts" and "percent" given in Examples are weight parts and weight percent unless specifically stated otherwise.

1. Evaluating the Magnetic Powder and Magnetic Tape

The methods of evaluating the magnetic powders and magnetic tapes of Examples and Comparative Examples set forth further below are given below. All the evaluations were conducted in an environment of 23° C.±1° C. The activation volume V, anisotropy constant Ku, and KuV/kT in the present invention refer to values measured by the methods described in this section.

(1) Magnetic Characteristics (Hc, σs)

The magnetic characteristics of the magnetic particles denoted by Nos. 1 to 18 in Table 1 were measured with a vibrating sample magnetic fluxmeter (made by Toei Industry Co., Ltd.) at a magnetic field intensity of 1,194 kA/m (15 kOe).

(2) Output, Noise, SNR

The reproduction output, noise, and SNR of magnetic tape Nos. A to F in Table 3 were measured after mounting a recording head (MIG, gap 0.15 μm, 1.8 T) and a reproduction GMR head on a drum tester and recording a signal at a track density of 16 KTPI and at a linear recording density of 400 Kbpi (surface recording density of 6.4 Gbpsi).

(4) Activation Volume, Anisotropy Constant, and Thermal Stability KuV/kT

A vibrating sample magnetic fluxmeter (made by Toei Industry Co., Ltd.) was employed to measure the magnetic field sweep rate of the Hc measurement element at 3 minutes and at 30 minutes. The activation volume V and anisotropy constant Ku were calculated from the relational equation of the magnetization reversal volume and Hc due to thermal fluctuation indicated below.

$$Hc=2Ku/Ms(1-[(KuT/kV)\ln(At/0.693)]1/2)$$

[In the equation, Ku: anisotropy constant; Ms: saturation magnetization; k: Boltzmann constant; T: absolute temperature; V: activation volume; A: spin precession frequency; t: magnetic field reversal time]

(5) Coefficient of Variation of Particle Size Distribution

Photographs of the magnetic powders obtained in Examples and Comparative Examples were taken by a transmission electron microscope. In each photograph, 500 particles were randomly extracted and the average value of the plate diameter was adopted as the average plate diameter. The standard deviation of the values measured for 500 particles was calculated and divided by the average plate diameter to obtain the coefficient of variation of particle size distribution.

2. Examples and Comparative Examples of Hexagonal Strontium Ferrite Magnetic Powder Preparation; Comparative Examples of Hexagonal Barium Ferrite Magnetic Powder Preparation Once the value A and value F that were to be satisfied by the heated product following the crystallization heat treatment had been determined, the coordinates in the ternary diagram of starting material composition were determined based on value A and value F. The compositions determined in the ternary diagram of starting material composition based on value A and value F shown in Table 1 are the starting material compositions given in Table 1. Those of the compositions indicated in Table 1 that contained Al were determined by replacing a portion of the $SrO.B_2O_3$ and $2SrO.B_2O_3$ with $3SrO.Al_2O_3$. Those of the compositions indicated in Table 1 that contained Zn and Nb were determined by the replacement of Fe in $SrO.6Fe_2O_3$. To achieve the determined compositions, the various components were weighed out and mixed to obtain a starting material mixture. $SrCO_3$ was employed as the SrO component. $H_3BO_3$ was employed as the $B_2O_3$ component. $Fe_2O_3$ was employed as the $Fe_2O_3$ component. For the compositions containing Zn, Nb, and Al, ZnO, $Nb_2O_5$, and $Al(OH)_3$ were employed, respectively.

Each starting material mixture obtained was melted in a one-liter capacity platinum crucible and a tap hole provided in the bottom of the platinum crucible was heated while stirring at 1,420° C. to tap the melt in a rod shape at 6 g/s. The tapped liquid was quench rolled with a pair of water-cooled rolls to prepare an amorphous material.

A 300 g quantity of the amorphous material obtained was charged to an electric furnace. The temperature was raised at a rate of 3.5° C./min to the heating temperature indicated in Table 2, after which the temperature was maintained for 5 hours to precipitate (crystallize) strontium ferrite magnetic particles. Next, the crystallized product containing the strontium ferrite magnetic particles was coarsely pulverized in a mortar. In a two-liter glass vessel, 600 g of 5 mm φ Zr beads, a quantity of a 25% concentration of acetic acid required to neutralize SrO other than the strontium ferrite, and a quantity of pure water to make a total of 800 mL of aqueous solution were added. The mixture was dispersed for 3 hours in a paint shaker. The dispersion was separated from the beads and placed in a three-liter stainless steel beaker. The dispersion was treated for 3 hours at 100° C. It was then precipitated and decanted repeatedly in a centrifugal separator to clean it, and then dried to obtain a magnetic powder (Nos. 1 to 17).

For No. 18, with the exceptions that the starting material mixture of the composition shown in Table 1 was employed while varying the SrO component and employing $BaCO_3$ as the BaO component, and crystallization was conducted at the heating temperature indicated in Table 2, a magnetic powder was obtained by the same method as in Examples and Comparative Examples of hexagonal strontium ferrite magnetic powder production.

The magnetic powder obtained was subjected to X-ray diffraction analysis to confirm that it was M-type hexagonal ferrite. The hexagonal strontium ferrite magnetic powder and hexagonal barium ferrite magnetic powder prepared were evaluated by the same methods as those set forth above. The results are given in Table 2.

TABLE 1

| Magnetic material No. | Type of magnetic material | Value F wt % | Value A mol % | $B_2O_3$ component mol % | SrO component mol % | $Fe_2O_3$ component mol % | Element added at %/Fe |
|---|---|---|---|---|---|---|---|
| 1 | Comp. Ex. SrFe | 50 | 0 | 31.82 | 37.02 | 31.16 | — |
| 2 | Ex. SrFe | 50 | 30 | 27.42 | 40.92 | 31.67 | — |
| 3 | Ex. SrFe | 50 | 40 | 26.21 | 41.99 | 31.80 | — |
| 4 | Ex. SrFe | 50 | 50 | 25.10 | 42.97 | 31.93 | — |
| 5 | Ex. SrFe | 50 | 67 | 23.45 | 44.44 | 32.12 | — |
| 6 | Ex. SrFe | 50 | 85 | 21.87 | 45.83 | 32.30 | — |
| 7 | Ex. SrFe | 50 | 100 | 20.72 | 46.85 | 32.43 | — |
| 8 | Ex. SrFe | 45 | 100 | 22.30 | 49.30 | 28.50 | — |
| 9 | Ex. SrFe | 56 | 100 | 18.78 | 43.80 | 37.41 | — |
| 10 | Ex. SrFe | 50 | 85 | 21.87 | 45.83 | 32.30 | Al = 8 |
| 11 | Comp. Ex. SrFe | 50 | 0 | 31.82 | 37.02 | 31.16 | Zn = 2, Nb = 1 |
| 12 | Ex. SrFe | 50 | 85 | 21.87 | 45.83 | 32.30 | Zn = 2, Nb = 1 |
| 13 | Ex. SrFe | 50 | 50 | 25.10 | 42.97 | 31.93 | Zn = 2, Nb = 1 |
| 14 | Ex. SrFe | 40 | 50 | 28.66 | 47.04 | 24.30 | Zn = 2, Nb = 1 |
| 15 | Ex. SrFe | 50 | 100 | 20.72 | 46.85 | 32.43 | Zn = 2, Nb = 1 |
| 16 | Ex. SrFe | 50 | 85 | 21.87 | 45.83 | 32.30 | Al = 8, Zn = 4, Nb = 2 |
| 17 | Ex. SrFe | 50 | 100 | 20.72 | 46.85 | 32.43 | — |
| | | | | | BaO component mol % | | |
| 18 | Comp. Ex. BaFe | 50 | 100 | 20.72 | 46.85 | 32.43 | — |

TABLE 2

| Magnetic material No. | Type of magnetic material | Heat (crystallization) temp. ° C. | Vact nm³ | KuV/kT | σs Am²/kg | Hc kA/m | DTA crystallization temp. ° C. | Coefficient of variation of particle size distribution % |
|---|---|---|---|---|---|---|---|---|
| 1 | Comp. Ex. SrFe | 660 | 2197 | 82.8 | 53.5 | 266 | 667 | 45 |
| 2 | Ex. SrFe | 650 | 1840 | 82.2 | 55.2 | 286 | — | — |
| 3 | Ex. SrFe | 640 | 1720 | 80.1 | 55.6 | 292 | — | — |
| 4 | Ex. SrFe | 630 | 1637 | 78.6 | 56.8 | 299 | 633 | — |
| 5 | Ex. SrFe | 630 | 1405 | 68.8 | 55.6 | 264 | 635 | 25 |
| 6 | Ex. SrFe | 640 | 1235 | 59.6 | 53.4 | 204 | — | — |
| 7 | Ex. SrFe | 640 | 1107 | 49.6 | 49.5 | 144 | 638 | 25 |
| 8 | Ex. SrFe | 630 | 1140 | 51.5 | 47.8 | 152 | 633 | 25 |
| 9 | Ex. SrFe | 660 | 1222 | 55.4 | 50.9 | 172 | 644 | 30 |

TABLE 2-continued

| Magnetic material No. | Type of magnetic material | Heat (crystallization) temp. °C. | Vact nm³ | KuV/kT | σs Am²/kg | Hc kA/m | DTA crystallization temp. °C. | Coefficient of variation of particle size distribution % |
|---|---|---|---|---|---|---|---|---|
| 10 | Ex. SrFe | 660 | 1106 | 56.2 | 48.6 | 184 | 654 | — |
| 11 | Comp. Ex. SrFe | 660 | 2470 | 75.6 | 58.6 | 194 | — | — |
| 12 | Ex. SrFe | 660 | 1383 | 55.3 | 54.2 | 169 | 642 | — |
| 13 | Ex. SrFe | 630 | 1590 | 64.0 | 57.0 | 228 | — | — |
| 14 | Ex. SrFe | 630 | 1630 | 67.5 | 56.2 | 227 | — | — |
| 15 | Ex. SrFe | 660 | 1337 | 52.8 | 52.0 | 152 | 646 | 30 |
| 16 | Ex. SrFe | 660 | 1320 | 52.3 | 56.2 | 185 | — | — |
| 17 | Ex. SrFe | 730 | 1650 | 82.0 | 54.0 | 296 | 638 | — |
| 18 | Comp. Ex. BaFe | 650 | 1640 | 59.5 | 45.4 | 203 | 613 | — |

Based on the results given in Table 2, when employing the starting material mixtures having a composition, as a composition converted into an oxide, lying within the region enclosed by the four points:

(a) SrO=48.0 mol %, $Fe_2O_3$=17.2 mol %, $B_2O_3$=34.8 mol %;
(b) SrO=55.9 mol %, $Fe_2O_3$=17.7 mol %, $B_2O_3$=26.4 mol %;
(c) SrO=41.7 mol %, $Fe_2O_3$=40.9 mol %, $B_2O_3$=17.4 mol %;
(d) SrO=36.7 mol %, $Fe_2O_3$=40.1 mol %, $B_2O_3$=23.2 mol %;

in a ternary diagram with SrO, $Fe_2O_3$, and $B_2O_3$ as apexes in the glass crystallization method, it was possible to obtain microparticulate hexagonal strontium ferrite magnetic powder of uniform particle size distribution, not readily achieved by the conventional glass crystallization method.

Further, magnetic material Nos. 4, 14, and 17 exhibited higher coercive force Hc and KuV/kT values than the hexagonal barium ferrite magnetic powder of magnetic material No. 18, which was of about the same particle size (Vact). Thus, the hexagonal strontium ferrite magnetic powder was determined to be an effective powder for resolving the above-stated trilemma.

3. Examples and Comparative Examples Relating to Magnetic Recording Media (Magnetic Tapes)
3-1. Magnetic Layer Coating Liquid Formula
Hexagonal strontium ferrite magnetic powder (shown in Table 3): 100 parts
Polyurethane resin: 12 parts
  Weight average molecular weight: 10,000
  Sulfonic acid functional group content: 0.5 meq/g
Diamond microparticles (average particle diameter 50 nm): 2 parts
Carbon black (#55, made by Asahi Carbon, particle size 0.015 μm): 0.5 part
Stearic acid: 0.5 part
Butyl stearate: 2 parts
Methyl ethyl ketone: 180 parts
Cyclohexanone: 100 parts
2-2. Nonmagnetic Layer Coating Liquid Formula
Nonmagnetic powder α-iron oxide: 100 parts
  Average primary particle diameter: 0.09 μm
  Specific surface area by BET method: 50 m²/g
  pH: 7
  DBP oil absorption capacity: 27 to 38 g/1,000 g
  Surface treatment agent: $Al_2O_3$ 8 weight %
Carbon black (Conductex SC-U, made by Columbia Carbon): 25 parts
Vinyl chloride copolymer (MR104, made by Zeon Corp.): 13 parts
Polyurethane resin (UR8200, made by Toyobo): 5 parts
Phenylphosphonic acid: 3.5 parts
Butyl stearate: 1 part
Stearic acid: 2 parts
Methyl ethyl ketone: 205 parts
Cyclohexanone: 135 parts
3-3. Preparation of Magnetic Tape The various components of each of the above coating liquids were separately kneaded in kneaders. Each liquid was passed by pump through a horizontal sand mill in which 65 percent of the volume of the dispersion unit had been packed with 1.0 mm zirconia beads and dispersed for 120 minutes (essentially the time present in the dispersing element) at 2,000 rpm. To the nonmagnetic layer dispersion liquid obtained were added 6.5 parts of polyisocyanate. This was followed by the addition of 7 parts of methyl ethyl ketone. The liquids were then filtered with filters having an average pore diameter of 1 μm to prepare the nonmagnetic layer-forming and magnetic layer-forming coating liquids.

The nonmagnetic layer-forming coating liquid obtained was coated and dried to a dry thickness of 1.0 μm on a polyethylene naphthalate base 5 μm in thickness, after which the magnetic layer was applied to a thickness of 70 nm in a sequential lamination coating. After drying, the product was processed in a seven-segment calender at 90° C. and at a linear pressure of 300 kg/cm. It was then slit to ¼ inch width and surface polished to obtain a magnetic tape (Nos. A to F). The magnetic tapes prepared were evaluated by the above-described methods. The results are given in Table 3.

TABLE 3

| Medium No. | Magnetic material No. | | Output dB | Noise dB | SNR dB |
|---|---|---|---|---|---|
| A | 11 | Comp. Ex. | 0 | 0 | 0 |
| B | 12 | Ex. | −0.1 | −2.2 | 2.1 |
| C | 13 | Ex. | 0.0 | −1.8 | 1.7 |
| D | 14 | Ex. | 0.0 | −1.7 | 1.6 |
| E | 15 | Ex. | −0.1 | −2.3 | 2.1 |
| F | 16 | Ex. | 0.0 | −2.3 | 2.3 |

Based on the results in Table 3, the use of the hexagonal strontium ferrite magnetic powder obtained in Examples was determined to enhance the SNR. This was attributed to having achieved microparticulate hexagonal strontium ferrite magnetic powder of uniform particle size distribution, as indicated in Table 2.

4. Investigation of Starting Material Composition

Figure 2:
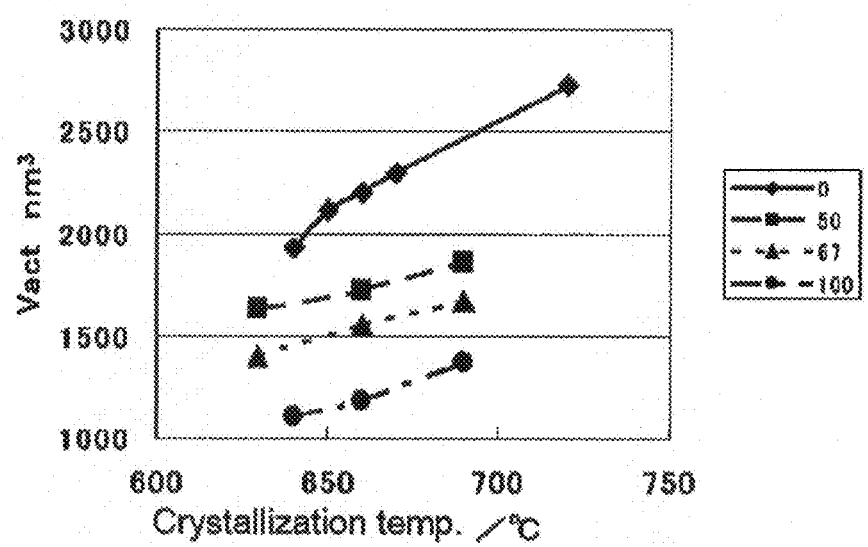
FIG. 2 shows investigation results (change in activation volume based on differences in A value) relating to the starting material composition.
Figure 3:
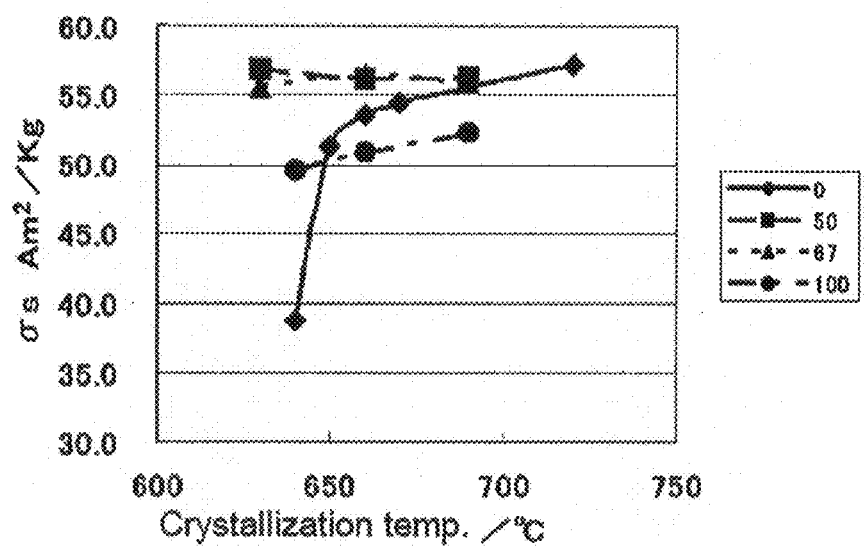
FIG. 3 shows investigation results (change in saturation magnetization based on differences in A value) relating to the starting material composition.

FIG. 2 is a graph of the relation between the crystallization heating temperature and the activation volume Vact measured by the method set forth above for the hexagonal strontium ferrite magnetic powders prepared in the same manner as above using the starting material mixtures of the compositions of No. 1 (value A 0%), No. 4 (value A 50%), No. 5 (value A 67%), and No. 7 (value A 100%) in Table 1 with the exception that the crystallization heating temperature was varied. FIG. 3 is a graph showing the relation between the crystallization heating temperature and the saturation magnetization as measured by the method set forth above.

When the crystallization temperatures of the amorphous materials obtained in the various manufacturing steps were measured by differential temperature analysis (DTA), they were as follows: No. 1 (667° C.), No. 4 (633° C.), No. 5 (635° C.), and No. 7 (638° C.).

Figure 4:
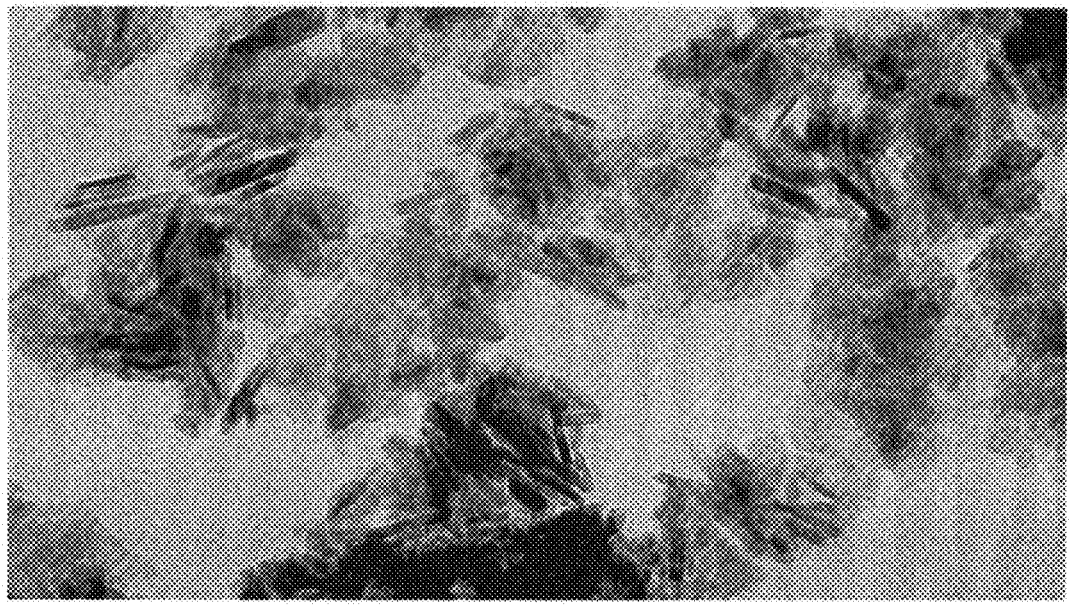
FIG. 4 is a photograph taken by a transmission electron microscope of the hexagonal strontium ferrite magnetic powder of a comparative example (magnetic material No. 1).
Figure 5:
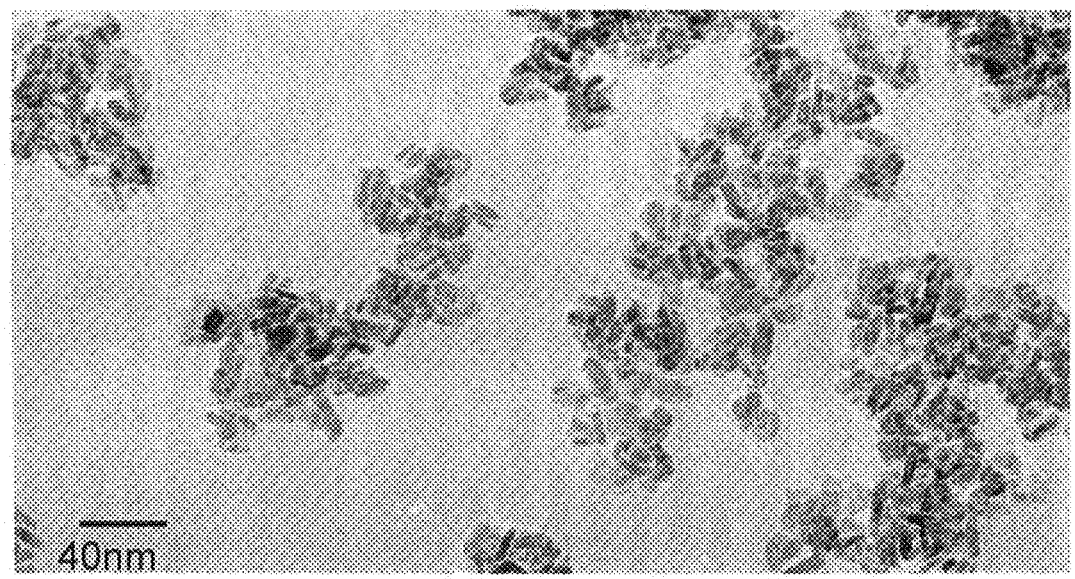
FIG. 5 is a photograph taken by a transmission electron microscope of the hexagonal strontium ferrite magnetic powder of Example (magnetic material No. 7).

Based on the graph of FIG. 2, the Vact decreased and the ease of obtaining microparticles increased as value A increased. FIG. 4 is a photograph of magnetic material No. 1 taken by a transmission electron microscope. FIG. 5 is a photograph magnetic material No. 7 taken by a transmission electron microscope at the same magnification as in FIG. 4. A comparison of FIGS. 4 and 5 confirms that microparticulate hexagonal strontium ferrite was obtained in Examples using the starting material mixture of the above-stated composition.

Based on the graph shown in FIG. 3, lowering the crystallization temperature to below the 667° C. DTA crystallization heating temperature in No. 1 (value A 0%) caused the σs to drop precipitously. This was attributed to inadequate progression of crystallization due to the excessively low crystallization heating temperature.

Figure 6:
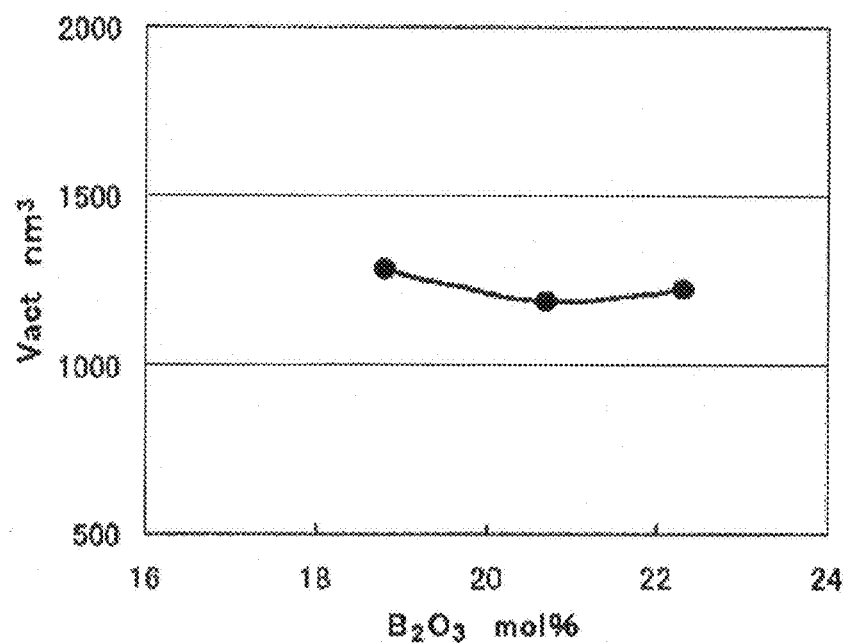
FIG. 6 shows investigation results (effect of the quantity of the $B_2O_3$ component on the activation volume) relating to the starting material composition.

In magnetic material Nos. 1 to 7, the quantity of component $B_2O_3$ decreased as value A increased. At the same time, the activation volume Vact decreased. FIG. 6 is a graph in which the activation volume Vact—measured by the same method as that set forth above for hexagonal strontium ferrite magnetic powder prepared by the same method as above with the exceptions that starting material mixtures of compositions Nos. 7, 8, and 9 in Table 1 with a constant value A and a varying value F were used and the crystallization heating temperature was changed to 660° C.—is plotted against the quantity of the $B_2O_3$ component. Based on the graph of FIG. 6, Vact was determined not to have greatly changed due to differences in the quantity of the $B_2O_3$ component. Based on the above result, the main reason for the reduction in size of the strontium ferrite was thought to be the change in value A, that is, the presence of $2SrO \cdot B_2O_3$. The DTA crystallization temperatures given above are all values measured by differential temperature analysis DTA for the crystallization temperature of the amorphous material obtained by the respective manufacturing steps. Once $2SrO \cdot B_2O_3$ was present following crystallization of the amorphous material, the DTA crystallization temperature decreased and the size of the particles was determined to tend to decrease.

Based on the results of the above investigation, it will be understood that determining the composition of the starting material mixture based on value A and value F was an extremely effective means of manufacturing hexagonal strontium ferrite magnetic powder by the glass crystallization method.

The present invention can provide a magnetic recording medium for high-density recording that affords good recording reproduction characteristics.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing hexagonal strontium ferrite magnetic powder, which comprises:
    melting a starting material mixture which has a composition, as a composition converted into an oxide, lying within a region enclosed by the following three points:
    (e) SrO=48.3 mol %, $Fe_2O_3$=17.2 mol %, $B_2O_3$=34.5 mol %;
    (f) SrO=55.9 mol %, $Fe_2O_3$=17.7 mol %, $B_2O_3$=26.4 mol %;
    (g) SrO=42.8 mol %, $Fe_2O_3$=39.1 mol %, $B_2O_3$=18.1 mol %;
    in a ternary diagram with SrO, $Fe_2O_3$, which optionally may include an Fe substitution element, and $B_2O_3$ as apexes, to provide a melt, and quenching the melt to obtain a solidified product; and
    heat treating the solidified product to precipitate hexagonal strontium ferrite magnetic particles within the solidified product,
    wherein:
    the heat treatment is conducted by heating and maintaining the solidified product in a temperature region ranging from 600 to 660° C.; and
    the heat treatment provides precipitated hexagonal strontium ferrite magnetic particles with an activation volume ranging from 1,000 to 1,383 $nm^3$.

2. A method of manufacturing a magnetic recording medium, which comprises:
    conducting the method of manufacturing according to claim 1 to provide hexagonal strontium ferrite magnetic powder; and
    preparing a magnetic layer with a magnetic coating material which comprises the hexagonal strontium ferrite magnetic powder and a binder, on a nonmagnetic support.

* * * * *